(12) United States Patent
Woignier et al.

(10) Patent No.: US 6,478,133 B1
(45) Date of Patent: Nov. 12, 2002

(54) STATIC DEVICE MAINTAINING THE HOMOGENEITY OF A MIXTURE OF POWDERS SUBJECTED TO A GRAVITY-INDUCED FLOW

(75) Inventors: Sylvie Woignier, Pertuis; Francis Gilly, Gap, both of (FR)

(73) Assignee: Compagnie Generale des Matieres Nucleaires, Velizy-Villacoublay (FR)

( * ) Notice: Subject to any disclaimer, the term of this patent is extended or adjusted under 35 U.S.C. 154(b) by 0 days.

(21) Appl. No.: 09/403,600
(22) PCT Filed: Apr. 23, 1998
(86) PCT No.: PCT/FR98/00813
§ 371 (c)(1),
(2), (4) Date: Oct. 22, 1999
(87) PCT Pub. No.: WO98/47791
PCT Pub. Date: Oct. 29, 1998

(30) Foreign Application Priority Data

Apr. 24, 1997 (FR) .............................................. 97 05077

(51) Int. Cl.⁷ .......................... B65G 11/00; B65G 11/10
(52) U.S. Cl. .......................... 193/27; 193/7; 193/25 E; 193/25 C; 193/25 S
(58) Field of Search .......................... 193/7, 25 E, 25 C, 193/25 S, 27

(56) References Cited

U.S. PATENT DOCUMENTS

| | | | |
|---|---|---|---|
| 1,839,712 A | 1/1932 | Sturtz | |
| 2,502,341 A | 3/1950 | Queirolo | |
| 2,693,264 A | 11/1954 | Waterbury | |
| 5,086,902 A | 2/1992 | Dunnigan | |

FOREIGN PATENT DOCUMENTS

| | | |
|---|---|---|
| FR | 1.385.615 | 12/1964 |
| FR | 1385615 | 12/1964 |
| FR | 2 621 447 | 4/1989 |
| FR | 2621447 | 4/1989 |

*Primary Examiner*—Christopher P. Ellis
*Assistant Examiner*—Gene O. Crawford
(74) *Attorney, Agent, or Firm*—Pearne & Gordon LLP

(57) ABSTRACT

A vertical flow path in a pipe is delimited by channels (3) disposed at an angle. The inclined channels produce a zigzag flow in a mixture of powders which follow the flow path. The zigzag flow causes stirring to maintain homogeneity of the mixture even if its components have very different physical characteristics.

2 Claims, 1 Drawing Sheet

STATIC DEVICE MAINTAINING THE HOMOGENEITY OF A MIXTURE OF POWDERS SUBJECTED TO A GRAVITY-INDUCED FLOW

The subject of the invention is a static device maintaining homogeneity of a mixture of powders subjected to gravity flow.

It is sometimes necessary to ensure the flow of mixtures of powders whose components have very different characteristics of density, granulometry, specific surface area, etc. Samples can be taken at different points on the path followed by the mixture in order to verify that its homogeneity is being maintained: it has in fact been found that segregation of at least some of the components of such mixtures arises very easily, which will compromise the quality of the manufacturing process and use of the mixture. This loss of homogeneity was produced in particular in the vertical sections of the flow paths, when the mixture was subjected to a free fall, probably because of the various effects of air resistance on the different components.

Solutions of different kinds have already been proposed in order to keep the powder mixtures homogeneous: some consist in treating the mixture itself, by choosing components having similar characteristics or by adding binders which provide cohesion of the different components, but these solutions which have a consequence for the composition of the mixture are constraining; mechanical devices have also been proposed, such as vibrating passages, mixers with screws, rotating spirals etc, placed at suitable points on the path followed by the mixture in order to produce stirring movements therein and to maintain its homogeneity or at least to re-establish it, but these motorised mechanical means complicate the device and make it more expensive.

A part is proposed here which can be used at the location of the vertical sections of the flow path, and whose advantage is in maintaining the homogeneity of the mixture by constant stirring and by means which are entirely static, and which therefore require no maintenance.

The vertical flow path is then delimited by a device composed essentially of a series of separate channels laterally inclined in opposite directions, each of the channels extending in a direction intersecting a channel immediately below.

This arrangement is similar to that of the document U.S. Pat. No. 2,502,341, designed in particular for coffee grains, but the invention is distinguished from the prior document by other characteristics: channels are formed by plates broadening and curving more towards the bottom, which reinforces the stirring of the mixture flowing over them; in addition, a pipe also delimits the flow path and contains the channels: the interior of the tube is partitioned and divided into compartments which prevent the dispersion of the finer particles, which tend to remain in suspension.

The description of the invention will now be gone into in more detail with the help of the following figures, annexed for purposes of illustration and non-limitatively:

Figures 1, 2:
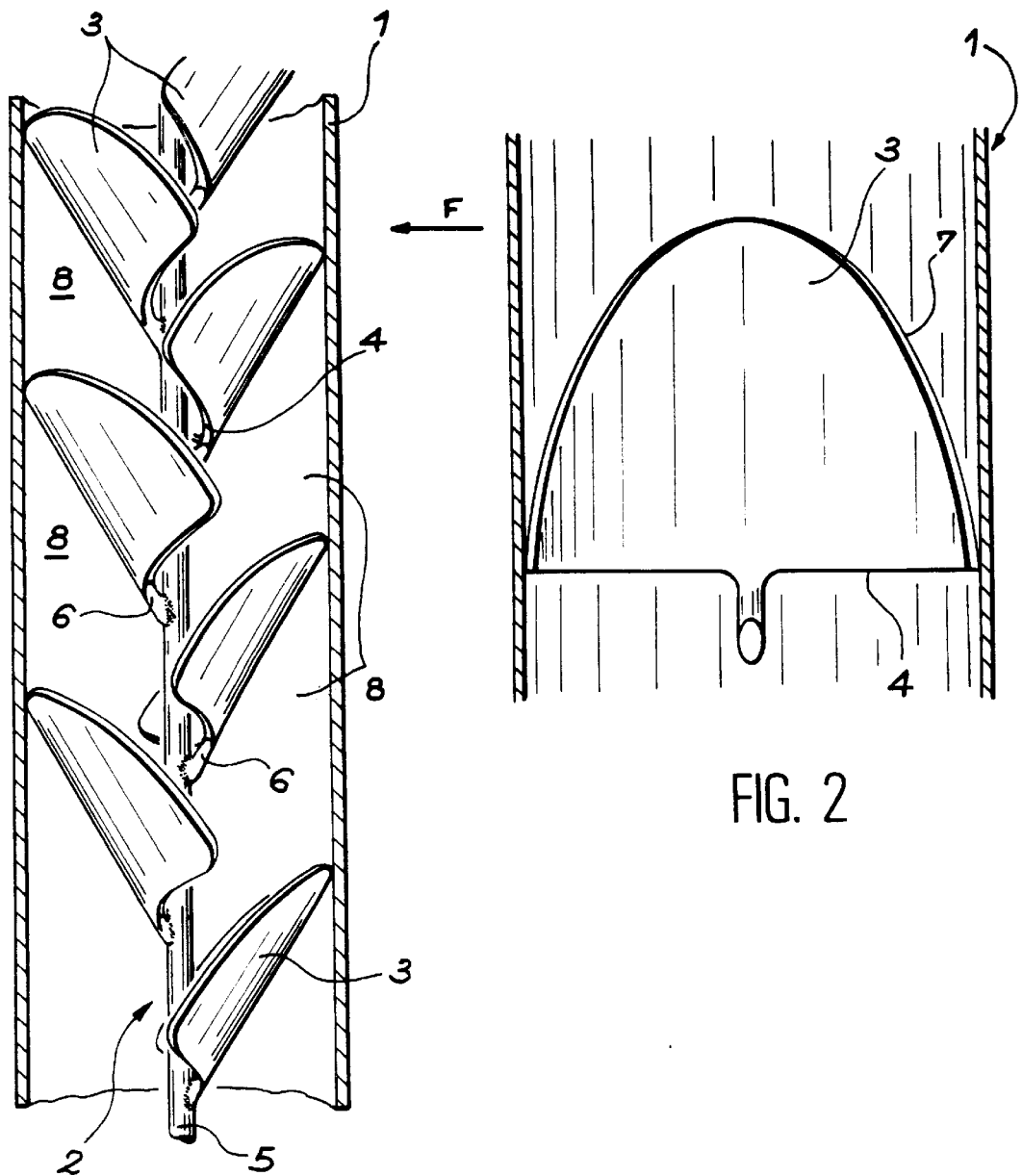
FIG. 1 is a general view of the device placed in the flow path.
FIG. 2 illustrates one of the channels used.

A pipe 1 delimits the volume of the vertical flow path of the powder mixture. The interior of the pipe 1 is occupied by the remainder 2 of the device of the invention and which comprises essentially a series of channels 3 disposed at an angle, placed one above the other and inclined laterally in alternating directions whilst making, with the vertical, angles which can be between 15° and 45°. The channels 3 are spaced apart from each other and each (except obviously for the lowest channel 3) extends in a direction which intersects the channel 3 immediately below. The powders, flowing successively in the channels 3, therefore leave them by running over their bottom edge 4 and are projected into the channel 3 situated just below, which then guides their flow by reorienting its direction.

The purely vertical flow of the free fall which would be produced if the pipe 1 were empty is therefore replaced by an overall vertical flow formed by zigzags from one channel 3 to another. A movement of stirring of the powder mixture is thus produced, which always re-establishes its homogeneity. The channels 3 being formed from plates fashioned to a shape which is relatively flat towards the top but more and more curved towards the bottom edge 4, the flow of powder tends to collect towards the centre of the channels 3 whilst sliding over them, which exerts an additional stirring. FIG. 2 shows that the channels can be produced from plates with an approximately semi-elliptical contour and whose shape is close to that of a shovel. The channels 3 can be connected to a common vertical connecting rod 5, which extends between their bottom edges 4, by means of pedicles 6.

The representation in FIG. 2 is a horizontal projection, that is to say the channel 3 which is illustrated therein is seen in the direction of the arrow F in FIG. 1. The channels 3 are chosen with a shape enabling them to bear over their entire perimeter 7 (apart from the bottom edge 4, and therefore over the entire curved part of the perimeter 7) on the internal face of the pipe 1. The inside thereof is therefore divided into compartments 8 by the channels 3, which communicate with each other only around the common connecting rod 5. This arrangement is important in the favoured use here of a mixture of powders, some of which can be very fine and tend to remain in suspension: they then remain in the same compartment 8 without being able to disperse and escape from the device, by rising up for example; they return sooner or later into the powder flow region, where they are taken up and entrained lower. A sufficiently constant flow over time is therefore obtained even for these very fine powders with a problematic fall.

What is claimed is:

1. A vertical flow path comprising a pipe having a top and a bottom, and a series of separate channels (3) disposed in the pipe, each of the channels being laterally inclined in a direction substantially opposite to the direction of the channels immediately adjacent, each of the channels extending in a direction intersecting a channel immediately below, the channels (3) being formed by plates disposed in the pipe, each plate broadening toward the bottom of the pipe, each plate having cross-sections lateral to the direction of the incline, the cross-sections each having an average radius of curvature, and the radii of curvature of the cross-sections in each individual plate generally decreasing toward the end of the plate nearer the bottom of the pipe, each channel (3) touching the pipe over part of its perimeter (7) and the channels dividing the interior of the pipe (1) into compartments (8).

2. A flow path according to claim 1, characterised in that the channels are connected by pedicles (6) to a common connecting rod (5) situated between the channels (3).

* * * * *